United States Patent Office 2,780,521
Patented Feb. 5, 1957

2,780,521

PROCESS FOR PRODUCING COLLOIDAL SILICA-FREE CALCIUM FLUORIDE

Charles A. Butt, Lakeland, Fla., assignor to International Minerals & Chemical Corporation, a corporation of New York No Drawing. Application March 22, 1954, Serial No. 417,965

5 Claims. (Cl. 23—88)

This invention relates to the production of fluoride chemicals. More particularly, it relates to a process for the manufacture of calcium fluoride and silica gel from waste gases.

Large quantities of waste gases containing hydrofluoric acid and/or silicon tetrafluoride are evolved in many industrial operations and present a serious disposal problem.

Atmospheric pollution is due not only to the presence of hydrofluoric acid, but also to the presence of silicon tetrafluoride which in contact with moisture readily hydrolyzes to yield additional quantities of fluosilicic acid.

Manufacture of fluorides commercially has in general been carried out by continuously neutralizing basic solutions with aqueous or anhydrous hydrofluoric acid. Calcium fluoride has also been produced by absorbing hydrofluoric acid on dry oolitic or pisolitic limestones, or by neutralizing aqueous hydrofluoric acid with precipitated calcium carbonate. These methods all involve the use of relatively pure fluorides for a neutralization reaction.

Recovery of fluorine from waste gases has been carried out by washing out the water soluble constituents of gases in an absorber. Such absorber treatments produce only a dilute solution of fluosilicic acid and such solutions have not in general been adaptable to the manufacture of pure fluoride chemicals. In these absorption processes the acid solution is usually decanted and treated with sodium chloride or calcium chloride to precipitate either sodium fluosilicate or calcium fluosilicate. When the decanted acid solution has been treated with fine calcium carbonate as a substitute for calcium chloride the product generally has been a mixed precipitate of calcium fluoride, calcium fluosilicate, and silica.

A principal difficulty in carrying out the processes above described has been the precipitation of calcium fluoride in a manner which prevents simultaneous precipitation of silica. In addition mixed precipitates are in general gelatinous or flocculent and present filtering difficulties.

It is a primary object of this invention, therefore, to overcome the difficulties and shortcomings of processes heretofore in use.

It is another object of this invention to precipitate calcium fluoride, while at the same time forming a colloidal solution of $SiO_2.nH_2O$ which can be separated from the fluoride precipitate.

It is still a further object of this invention to recover a commercially acceptable silica gel with high adsorptive properties as well as a calcium fluoride by-product.

These and other objects of the invention will become apparent to those skilled in the art from a reading of the following description.

Briefly, this process consists in first producing a solution of fluosilicic acid by absorbing fluorine containing gases in a scrubber which utilizes aqueous materials as the scrubbing medium. The acid solution after separation of precipitated silica is reacted with basic alkaline earth compounds capable of forming fluorides of relatively low solubility in aqueous media under concentration, pH and temperature conditions producing colloidal silica which can be separated from the calcium fluoride precipitate.

In more detail, if the fluorine-containing gases are a by-product of the manufacture of phosphoric acid or fertilizers, the gases are passed through an absorber where the fluorine bearing constituents of the gases are scrubbed out by an aqueous medium such as either water or an aqueous fluosilicic acid solution. Generally, in order to build up the fluosilicic acid content of the aqueous medium, a portion of the aqueous absorber effluent is continuously recycled to the absorber. For the purpose of this process, the solution issuing from the absorber is controlled to have a fluosilicic acid concentration of between about 3° and about 7° Bé., i. e., 2½% $H_2SiF_6$ to about 6% $H_2SiF_6$, with concentrations in the range of about 3% to about 3.8% $H_2SiF_6$ preferred.

Hydrofluosilicic acid solution from the scrubber is treated to remove any precipitated silica as by filtering, settling and decantation or equivalent operation.

The filtered or clarified solution of $H_2SiF_6$ is mixed with finely divided calcium carbonate in amounts giving a mole ratio of $H_2SiF_6$ to $CaCO_3$ of 1 to 3 or a slight excess thereover. The reactants preferably are brought together for reaction under conditions to maintain a solution pH in the range between about 3.5 and about 6.7, and preferably in the range of about 5.5 to about 6.5, inasmuch as above this range filtration rates are uneconomically low.

The reaction of acid with calcium carbonate is only slightly exothermic and presents no problem in reaction temperature control. In general the reaction temperature is maintained between about 35° F. and about 130° F. in order to keep the colloidal $SiO_2$ from gelling before and/or during filtration. In order to obtain the highest possible recovery of $SiO_2$, a preferred temperature range for operation is generally maintained in the range of about 60° F. to about 90° F.

After reaction of acid solution and basic reactant, the impure calcium fluoride solids are filtered or otherwise treated to separate the cake from the silica solution. The filtrate from this separation operaion may be adjusted in pH by the addition of an acid such as sulfuric or hydrochloric acid to accomplish changes in gel properties, faster gelling, and similar effects.

After separation of the calcium fluoride cake the cake is washed and dried. This dry cake contains $SiO_2$ in proportions of about 4% to about 7% by weight. The separated filtrate when gelled and dried produces a surface active silica substantially free of fluorine and other impurities. After gelling the product can be dried under controlled conditions and requires no washing.

The invention will be further understood from study of the following examples.

Example I

Phosphate rock and sulfuric acid mixed in proportions to produce about 100 tons per day of ordinary superphosphate evolves gases which upon passage through a water absorber into which was recycled a portion of the hydrofluosilicic acid solution product results in the obtaing of a solution testing 4.2 Bé. at 70° F. (3.8% $H_2SiF_6$).

This solution was heated to approximately 86° F. and to the solution was added limestone in the form of pulverized marble analyzing approximately 95% $CaCO_3$ and about 2.5% $MgCO_3$.

This pulverized marble had a particle size of about 90% through a 200 mesh standard screen. The mixture was vigorously agitated during the addition of limestone and for 10 minutes thereafter. The ratio of reacting components was maintained at approximately 10 parts by weight of 4.2° Bé. solution to 1 part by weight of calcium carbonate.

The slurry was filtered to recover a calcium fluoride cake and a filtrate. The filtrate showed a pH of 5.3. This filtrate was allowed to set at 85° C. for approximately 16 hours and then dried for 2 hours at 105° C. Moisture absorption tests established that this product had high adsorptive properties.

*Example II*

Florida phosphate rock and sulfuric acid mixed in proportions to produce about 100 tons per day of ordinary superphosphate evolves gases which upon passage through a water absorber into which was fed water and a portion of the hydrofluosilicic acid solution product, as recycled, produced approximately 1950 pounds of solution testing approximately 5° Bé. at 60° F. This solution was heated to approximately 90° F. and to the solution was added a portion of comminuted limestone of the same type added in Example I. The mixture was vigorously agitated while marble dust was added over a period of approximately 15 minutes, and the agitation was continued approximately 5 minutes after addition of calcium carbonate was ended. The ratio of reacting components was 500 units by weight of solution to 48.9 units of marble dust.

The slurry was filtered to recover a calcium fluoride cake and a filtrate. The filtrate showed a pH of approximately 5.2. This filtrate was maintained at 85° C. for approximately 10 hours and then dried for three hours at approximately 105° C.

The calcium fluoride cake was given one wash with water and dried for approximately 8 hours at a temperature of approximately 150° C. Analysis of the dry calcium fluoride cake was as follows:

| | The above $CaF_2$ Cake |
|---|---|
| Percent loss on ignition @ 900° C | 6.62 |
| Percent F | 41.92 |
| Percent CaO | 62.51 |
| Percent $SiO_2$ | 4.80 |
| Percent $CO_2$ | 3.56 |

The yield of products was 13.6 units of dried silica gel, and 81.6 units of dried calcium fluoride cake per each 1000 units by weight of solution obtained by the treatment of waste gas.

Having thus fully described and illustrated the character of the invention, what is desired to be secured and claimed by Letters Patent is:

1. A process for producing calcium fluoride which comprises reacting a solids-free aqueous fluosilicic acid solution containing between about 2.5% and about 6.0% of fluosilicic acid, while at a temperature in the range between 35° F. and 130° F., with ground limestone in sufficient amount to produce a pH of between about 3.5 and about 6.7 in the reaction medium and separating the precipitated calcium fluoride from the aqueous medium containing colloidal silica after the reaction has been substantially completed.

2. A process as in claim 1 in which the pH of the liquid mixture reaction medium is maintained at between about 5.5 and about 6.5.

3. A process as in claim 1 wherein the temperature of the reaction medium is maintained between 60° F. and 90° F.

4. A process for the production of calcium fluoride which comprises passing den gases containing silicon tetrafluoride through an aqueous medium selected from the group consisting of water and aqueous fluosilicic acid until a fluosilicic acid aqueous solution of between about 2.5% and 6.0% is attained, separating the solid material from the liquid, reacting the acidic solids-free aqueous solution, while at a temperature in the range of between 35° F. and 130° F., with ground limestone in sufficient amount to produce a filtered reaction solution having a pH between about 3.5 and about 6.7, and separating the calcium fluoride precipitate from the aqueous medium containing colloidal silica upon substantial completion of the reaction.

5. A process for the production of calcium fluoride from den gases which comprises scrubbing the gases with an aqueous medium selected from the group consisting of water and fluosilicic acid until the fluosilicic acid solution concentration of about 5° Bé. measured at 60° F. is attained, filtering out solid material, reacting the solids-free aqueous fluosilicic acid solution, while at a temperature of about 90° F. with finely ground limestone, a ratio of reactants being about 500 parts by weight of solution to about 47.2% by weight of limestone on a 100% $CaCO_3$ basis, to produce a slurry, the solution thereof having a pH of about 5.2 and separating calcium fluoride precipitate from the aqueous solution containing colloidal silica upon substantial completion of the reaction.

References Cited in the file of this patent

UNITED STATES PATENTS

| | | |
|---|---|---|
| 789,671 | Reich | May 9, 1905 |
| 1,456,594 | Howard | May 29, 1923 |
| 1,617,708 | Gehauf et al. | Feb. 15, 1927 |
| 2,385,208 | Jones | Sept. 18, 1945 |
| 2,447,359 | Oakley | Aug. 17, 1948 |
| 2,573,704 | Gilbert et al. | Nov. 6, 1951 |
| 2,584,894 | MacIntire | Feb. 5, 1952 |

OTHER REFERENCES

"Fluorine Control and Recovery," By D. D. Morris, B. P. Sutherland and C. H. Wright, Canadian Chem. and Metallurgy, August 1937, pages 271–273.